United States Patent [19]
Ruschmann

[11] Patent Number: 5,587,213
[45] Date of Patent: Dec. 24, 1996

[54] STRETCH ADORNMENTS

[76] Inventor: Roberta M. Ruschmann, 260 Minebrook Rd., Bernardsville, N.J.

[21] Appl. No.: 340,635

[22] Filed: Nov. 16, 1994

[51] Int. Cl.$^6$ ....................................................... B32B 1/00
[52] U.S. Cl. ........................... 428/12; 428/54; 428/66.5; 428/66.6; 112/414
[58] Field of Search .................................... 428/65, 7, 12, 428/54; 28/155–157; 112/413, 414

[56] References Cited

U.S. PATENT DOCUMENTS 3,699,704  10/1972  Hakim .......................................... 428/7
5,282,692  2/1994  McLoed .................................... 428/54

*Primary Examiner*—Alexander Thomas
*Attorney, Agent, or Firm*—Kane, Dalsimer, Sullivan, Kurucz, Levy, Eisele and Richard, LLP

[57] ABSTRACT

An adornment for affixing to fabric comprised of several ornaments in a series which are attached by elastic threads.

11 Claims, 1 Drawing Sheet

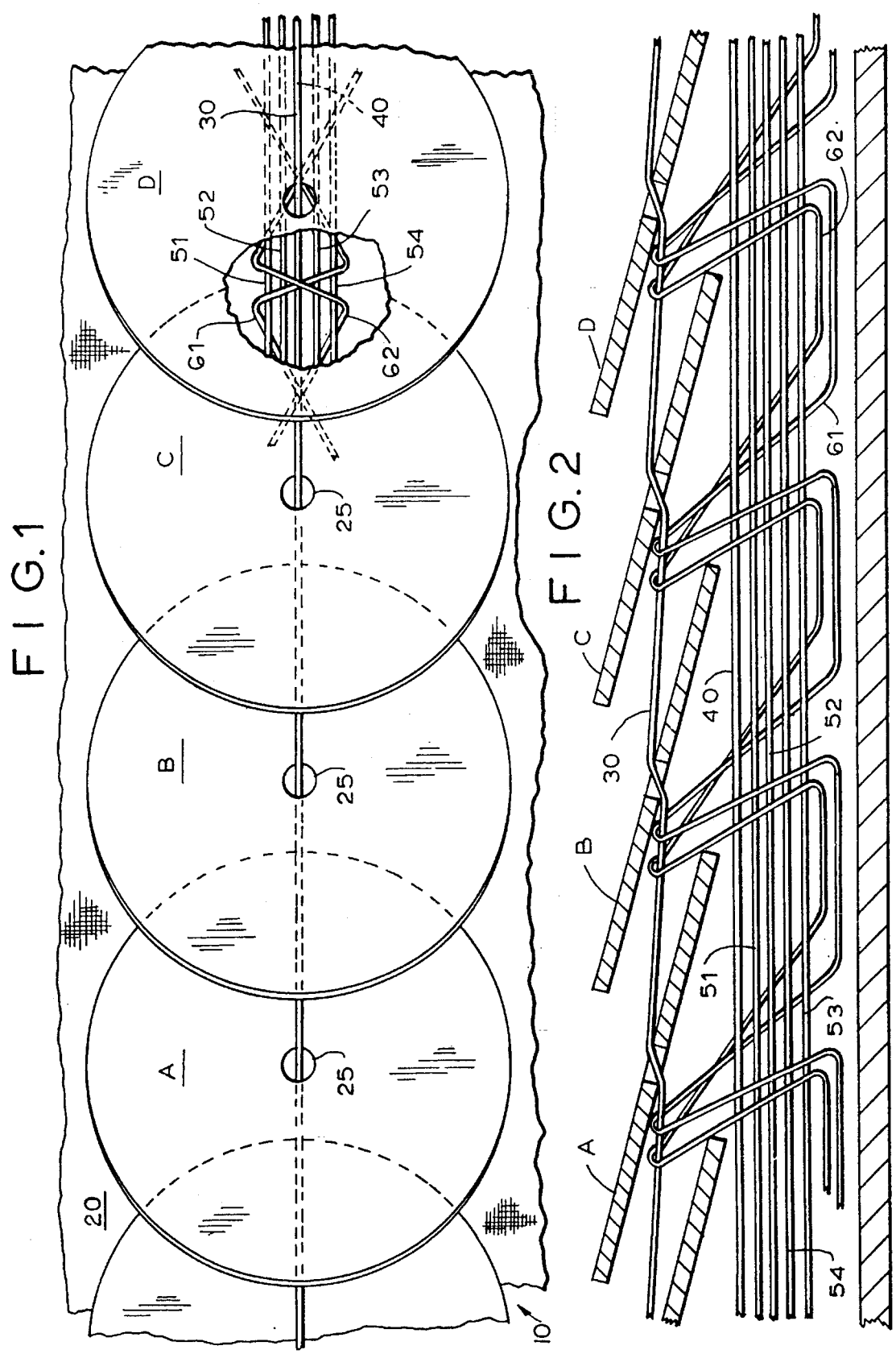

STRETCH ADORNMENTS

FIELD OF INVENTION

The invention relates to an adornment for fabrics and more particularly to a string of ornaments, particularly sequins which may be stretched.

BACKGROUND OF THE INVENTION

The affixing of ornaments such as beads and sequins to fabric is a time-consuming, labor intensive operation in the garment industry. Originally each individual ornament was hand sewn. Heretofor strings of ornaments were available having threads which run the length of the underside of the string. These strings present a considerable cost saving in that they permit the sewer to quickly attach a large number of ornaments. However, the strings must still be sewn by hand. When strings of ornaments are sewn on by hand in a fixed shape, constant attention must be given to its shape. This also represents considerable labor costs.

An improvement for affixing adornments to fabric that alleviates the high labor cost of hand sewing, and allows strings of ornaments to be used as a separate unit with a rigidity of their own is that disclosed in U.S. Pat. No. 4,952,436 issued Aug. 28, 1990. While the improvement addresses the problems of the past, it does not address the situation where it is desired to have sequins on a stretchable fabric.

SUMMARY OF THE INVENTION

The primary object of the invention is to provide sequins which can be quickly and easily attached to fabric which is stretchable or in a situation where the sequins are stretched which is neither labor intensive nor requires expensive equipment. Another object of the invention is to provide affixing sequins to a fabric which involves placing a string of sequins on a fabric which allows both the fabric and sequins to stretch. The string of sequins contains at least one but preferably more elastic threads. Upon affixing the string of sequins to the fabric, the elastic threads allow the string of sequins to expand and contract along with the fabric.

An additional object of the present invention is to provide a stretchable string of sequins which can be quickly and easily attached to a fabric.

These and various other features of novelty which characterize the invention are pointed out with particularity in the claims annexed hereto and forming a part hereof. However, for a better understanding of the invention, reference should be had to the drawings which form a further part hereof, and to the accompanying descriptive matter, in which there is illustrated and described a preferred embodiment of the invention.

BRIEF DESCRIPTION OF THE DRAWINGS

In the drawings in which like reference numerals and letters indicate corresponding parts throughout the several views:

FIG. 1 is a front view, on an enlarged scale, of a section of fabric embodying the present invention; and FIG. 2 is a cross-sectional view of the present invention affixed to a fabric showing the structure of threads used to hold the ornaments together and to the fabric.

DESCRIPTION OF THE PREFERRED EMBODIMENT

Reference is now made to the Figures which show an adornment 10 attached to a fabric 20. The fabric is preferably cloth which can be selected from a wide range of materials as well as synthetic materials. The fabric can also be made of a material having an elastic material thereby being stretchable. The cloth may also be made from paper or other materials.

The series of individual sequins A, B, C, D lie face upon the cloth. The sequins are shown to be overlapping so that the edge 22 of sequin B touches the sequin A adjacent eye 25. Alternate embodiments are foreseen in which the adjacent sequins either touch edge to edge, overlap slightly, or are spaced at either periodic or non-periodic intervals. The exact position of adjacent sequins is a matter of preference.

A main thread 30 runs through the eyes of each ornament. The main thread, like the other threads mentioned below, may be formed from either natural or synthetic material and is elastic i.e. stretchable. A filler thread 40 and four threads 51, 52, 53, 54 run essentially parallel to the main thread along the underside of the ornaments. These threads may also be made of elastic material. Two bobbin threads 61 and 62 entwine the main thread, filler thread, and 51–54 threads and serve to bind them in close proximity to each other and hold them along the underside of the ornaments. Alternate embodiments utilize elastic threads as the bobbin thread with or without filler threads or the main thread either alone or in combination with each other or in combination with elastic threads. It is preferable that most if not all of the threads are made of elastic material.

The ornament 10 is affixed to the fabric by placing it so the underside contacts the fabric. It may then be applied to the fabric by conventional means.

While the invention has been particularly shown and described with reference to preferred embodiments thereof, it will be understood by those skilled in the art that variations in form may be made without departing from the spirit and scope of the invention.

I claim:

1. An adornment for affixing the same to a surface, said adornment comprising a plurality of ornaments and thread means comprising elastic main thread operatively engaging a plurality of such ornaments for affixing the same to a surface, said thread means allows said ornaments to be stretchably attached to a surface, and bobbin thread, said thread means being the sole means of maintaining said ornaments at a predetermined spaced relationship with respect to each other prior to affixing to a surface.

2. The adornment of claim 1 wherein said bobbin thread is elastic.

3. The adornment of claim 1 which includes filler thread which is elastic.

4. The adornment of claim 1 wherein said thread means comprises at least one binder thread and at least one filler thread.

5. The adornment of claim 1 wherein said thread means comprises at least one bobbin thread, at least one filler thread and the main thread.

6. An adornment for affixing the same to a surface, said adornment comprising:

a plurality of ornaments arranged in series;

a main thread means for maintaining the ornaments in position;

at least one filler thread bound to said series of ornaments by at least one bobbin thread;

said main thread means in association with said bobbin thread to maintain said ornaments in a predetermined relationship with respect to each other prior to affixing the same to a surface; and said main thread means; filler thread and bobbin thread being made of an elastic material so as to allow the plurality of ornaments to stretch when affixed to a fabric.

7. The adornment of claim 6 wherein said ornaments are sequins.

8. The ornament of claim 7 wherein said sequins are lying edge to edge.

9. The adornment of claim 7 wherein said sequins are at spaced intervals.

10. The adornment of claim 7 wherein said sequins are either lying at spaced intervals to each other or edge to edge.

11. The adornment of claim 7 wherein said sequins are overlying so that the edge of a first sequin lies on the top side of an adjacent sequin.

\* \* \* \* \*